(12) United States Patent
Takken et al.

(10) Patent No.: US 6,359,710 B1
(45) Date of Patent: Mar. 19, 2002

(54) IR RADIATION-SEEKER MISSILE JAMMER

(75) Inventors: Edward H. Takken, Alexandria; William V. Goodell, Falls Church, both of VA (US); Joseph E. Pasko, Everett, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 06/179,135

(22) Filed: Aug. 8, 1980

(51) Int. Cl.[7] .............. H04K 3/00; G01J 5/02; F41G 7/00
(52) U.S. Cl. .......... 359/111; 89/41 L; 250/342; 250/504 R; 244/3.13; 244/3.16
(58) Field of Search .......... 343/18 E; 250/495, 250/504 R, 504 H, 338; 89/41 L, 1.11; 244/3.16; 455/605, 608, 618; 359/111

(56) References Cited

U.S. PATENT DOCUMENTS

| | | | | |
|---|---|---|---|---|
| 3,427,611 A | * | 2/1969 | Enenstein | 343/6 R |
| 3,514,776 A | * | 5/1970 | Mulready | 343/6 R |
| 3,720,944 A | * | 3/1973 | Kramer et al. | 343/18 E |
| 3,771,731 A | * | 11/1973 | Dyner | 250/495 |
| 3,797,395 A | * | 3/1974 | Tyroler | 250/495 |
| 3,878,525 A | * | 4/1975 | Alpers | 343/18 E |
| 3,900,875 A | * | 8/1975 | Scheets | 343/18 E |
| 3,942,179 A | * | 3/1976 | Dorn | 343/18 E |
| 3,978,342 A | * | 8/1976 | Hagen et al. | 250/495 |
| 4,112,300 A | * | 9/1978 | Hall, Jr. et al. | 89/41 L |

* cited by examiner

*Primary Examiner*—Stephen C Buczinski
(74) *Attorney, Agent, or Firm*—John J. Karacek; Thomas E. McDonnell

(57) ABSTRACT

Means and method for jamming IR radiation-seeking threat missiles comprising means for generating wavetrains of randomized pulses of radiation of the same wavelengths at which the threat missiles are operating. The apparatus consists generally of radiation-generating means, means for pulse-modulating the radiation-generating means or the radiation itself with a wavetrain of random or pseudo-random pulses, and means for directing the modulated radiation at a target.

1 Claim, 1 Drawing Sheet

IR RADIATION-SEEKER MISSILE JAMMER

BACKGROUND OF THE INVENTION

This invention relates to countermeasures against infrared (IR) radiation-seeking devices and especially to a pulse system and method for jamming IR-seeking reticle-type missiles.

Present operational U.S. IR missile jammers rely on prior knowledge of threat-missile operating characteristics and, in fact, normally operate at frequencies close to those of threat-missile gyro spin rates. Previous IR countermeasures designed to defeat IR-guided missiles which use reticles for encoding target information utilize three general techniques: deception, disruption and damage. Deception and disruption generally occur at irradiance levels a few orders of magnitude greater than the seekers noise equivalent temperature (NET). This level may vary from $10^{-11}$ to $10^{-8}$ watts/cm$^2$ for most reticle-type seekers. Present jammers operate at jammer-to-target (J/S) signal levels of from 2 to 8, typically. Some jammers use electrically modulated, alkali-metal-seeded, rare-gas arc sources while some employ fuel-fired or electrically heated grey-body sources which are mechanically modulated by one or more rotating and/or slotted discs, slats or cylinders. The primary method of deception jamming employed these devices relies on the creation of false signals in the missile seekers electronic processing system, especially in the inner gyro tracking loop of spin-scan missiles. After amplification, this false or deceptive signal causes the gyro to precess in a direction looking away from the true target. The result when the target passes out of the gyro-telescope's field-of-view is called "optical break lock".

These jammers are also sometimes effective against conical-scan seekers but for somewhat different reasons. In con-scan seekers, the maximum disruption of the inner gyro tracking loop is usually no more than a wobble superimposed on the correct motion of the gyro as it follows the target. With deception jamming specially chosen frequencies pass into the seeker's airframe guidance section which is disrupted by non-linearities, dither, or target-signal suppression. The end result for these con-scan seekers is that, although the gyro tracks, the canard wing deflections are either insufficient or too distorted to fly the missile to its target.

The primary disadvantage of present IR jammer systems is that their effectiveness depends on having prior information about the critical gyro spin frequencies of the threat missiles to be countered. Unfortunately, little is known about the internal functions of any but the oldest operational IR missiles in the inventories of various nations. There are additional difficulties, such as the spectral output and inflexibility of modulation schemes of current U.S. IR jammers.

SUMMARY OF THE INVENTION

Accordingly, an object of the present invention is to reduce the dependence of jam-format effectiveness against IR-seeker missiles on prior knowledge of threat-missile characteristics.

The objects and advantages of the present invention are accomplished by employing a pulse jamming system against IR-seeking missiles, in which the pulse-train characteristics, especially the pulse spacings, are randomized.

DETAILED DESCRIPTION OF THE INVENTION

Figure 1:
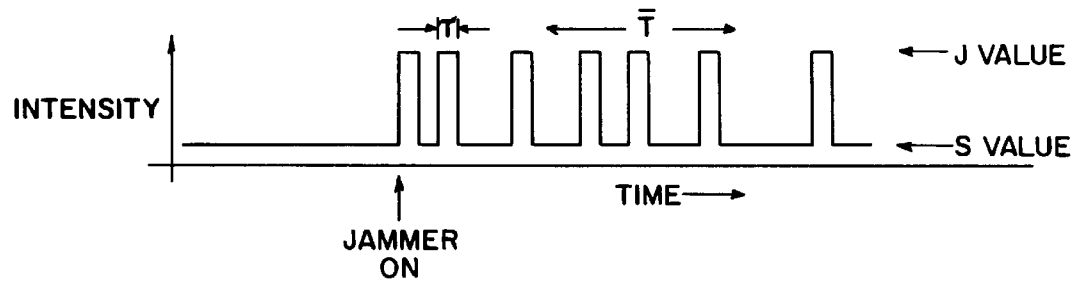
FIG. 1 as a schematic illustration of a typical jamming waveform.

FIG. 1 shows a typical pulsed waveform for an IR jamming signal. The symbol $\tau$ denotes pulse duration and the parameter $\overline{T}$ represents the average spacing between pulses (e.g., count 1000 pulses and divide by the time interval over which they occur), J represents the jammer signal intensity level and S represents the target signal intensity level. It is to be noted that the pulses are randomized with respect to time, i.e., the spacing between pulses is randomized.

It is also possible to randomize the pulse widths, shapes and height.

Figure 2:
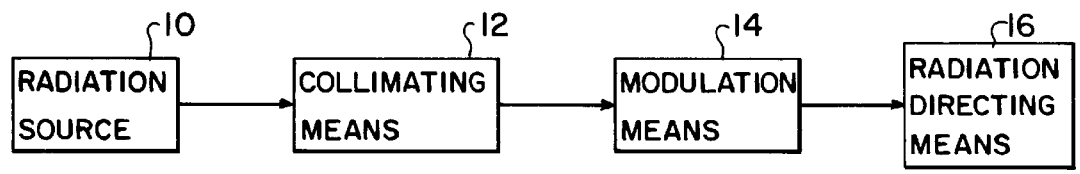
FIG. 2 is a schematic block diagram of an embodiment of apparatus for producing a jamming waveform.

FIG. 2 shows in block form an embodiment of apparatus for producing a randomized pulse train useful for IR jamming purposes. The radiation source, or radiation-generating means, 10 could be a laser, for example preferably multiline, with the same wavelengths as the threat missiles it is supposed to jam. With a laser as the radiation source, a collimating means 12 may not be necessary since laser radiation is highly directional, but it is useful with other radiation sources.

The modulation means 14 may comprise an electro-acousto-optical modulation means. For example, it may comprise a binary random-pulse signal generator (electronic type), an acoustic wave generator which is modulated by the pulsed output of the random-pulse signal generator and an acousto-optic crystal the index of refraction of which is changed by the modulated acoustic waves passing through it, so that, when the pulses are present, the laser radiation passes straight thru but, when the pulses are absent, the laser radiation is diffracted to one side. The pulses of laser radiation are then directed to the target by a radiation-directing means 16 which may comprise a lens.

Figure 3:
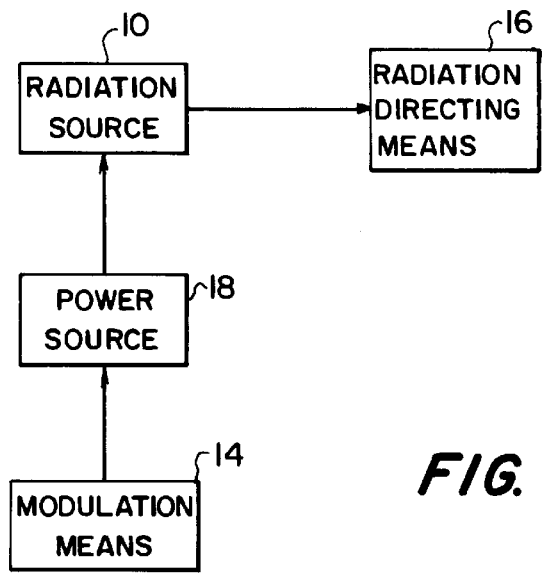
FIG. 3 is a schematic block diagram of a second embodiment of the invention.

Other schemes are possible and may demand small changes in the general scheme shown in FIG. 2. For example, the radiation source 10 may be an alkali-metal-seeded rare-gas (e.g., Xe) are source and there would have to be a power source 18 (see FIG. 3) between the arc source and the modulation means which could again be a random pulse generator. The arc source would be turned on whenever a power source pulse was applied to it. In this case, the pulse generator and power source would be considered the modulation means. A radiation-directing means 16, such as a collimating lens, would receive the output of the radiation source directly.

The radiation source 10 could also be an electrically heated hot body supplied by the power source 18 or a flash lamp, e.g., Na or Xe.

An electro-optic modulator utilizing two polarizing plates or lenses could be used. In a non-energized condition, the polarizers could be oriented at 90° angles relative to each other so that no laser radiation, for example, could pass thru the output polarizer. In the case where a pulse voltage is placed on the input polarizer, the voltage changes the polarization of the input plate by 90° so that the directions of polarization in the two polarizers are the same and laser radiation passes thru to be directed at the target.

It is also possible to have a radiation source which is an incoherent or grey body source electrically modulated by piezo-electric materials.

Although the apparatus described herein would most likely be used against reticle-type radiation-seeking missiles, it would also be useful against non-reticle-type radiation-seeking missiles.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A method for jamming IR-seeking mobile devices comprising the steps of:

generating a series of pulses of IR energy and randomizing the lengths of the time intervals between the pulses; and propagating said pulse energy in the direction of an IR-seeking mobile device.

* * * * *